(12) United States Patent
Diels

(10) Patent No.: US 7,593,643 B2
(45) Date of Patent: Sep. 22, 2009

(54) METHOD AND APPARATUS FOR FEMTOSECOND COMMUNICATION

(75) Inventor: Jean-Claude Diels, Albuquerque, NM (US)

(73) Assignee: STC. UNM, Albuquerque, NM (US)

( * ) Notice: Subject to any disclaimer, the term of this patent is extended or adjusted under 35 U.S.C. 154(b) by 567 days.

(21) Appl. No.: 11/189,558

(22) Filed: Jul. 26, 2005

(65) Prior Publication Data

US 2006/0023759 A1 Feb. 2, 2006

Related U.S. Application Data

(60) Provisional application No. 60/521,952, filed on Jul. 26, 2004.

(51) Int. Cl.
*H04B 10/12* (2006.01)
(52) U.S. Cl. .................................. 398/146; 398/80
(58) Field of Classification Search .............. 398/80, 398/146
See application file for complete search history.

(56) References Cited

U.S. PATENT DOCUMENTS

| | | | |
|---|---|---|---|
| 6,175,437 B1 | 1/2001 | Diels et al. | |
| 6,288,659 B1 * | 9/2001 | Jalali et al. | 341/137 |
| 6,501,578 B1 | 12/2002 | Bernstein et al. | |
| 6,650,682 B1 | 11/2003 | Diels et al. | |

OTHER PUBLICATIONS

Arissian, Ladan , et al., "Mode-locked laser as a combined radio-frequency and optical clock, stabilized to a reference cavity, and calibrated through coherent interaction with rubidium", *Applications of Photonic Technology 6., Proceedings of the SPIE*, vol. 5260, Edited by Lessard, Roger A.; Lampropoulos, George A., (2003), 217-225.

Bennett, C. V., et al., "Principles of parametric temporal imaging. I. System configurations", *IEEE Journal of Quantum Electronics*, 36(4), (Apr. 2000), 430-437.

Bennett, C. V., "Principles of parametric temporal imaging. II. System performance", *IEEE Journal of Quantum Electronics*, 36(6), (Jun. 2000), 649-655.

Foreman, S. M., et al., "Sub-femtosecond timing jitter between two independent, actively synchronized, mode-locked lasers", *Technical Digest. Summaries of papers presented at the Conference on Lasers and Electro-Optics. Conference Edition*, 1(1), (2002), 602-3.

Kolner, Brian H., et al., "Temporal imaging with a time lens", *Optics Letters*, 14(12), (Jun. 1989), 630-632.

Wei, Z. , et al., "Generation of two-color femtosecond pulses by self-synchronizing Ti:sapphire and Cr:forsterite lasers", *Optics Letters*, 26(22), (Nov. 15, 2001), 1806-1808.

Weiner, A. M., et al., "Programmable shaping of femtosecond optical pulses by use of 128-element liquid crystal phase modulator", *IEEE Journal of Quantum Electronics*, 28(4), (Apr. 1992), 908-920.

* cited by examiner

*Primary Examiner*—Christina Y Leung
(74) *Attorney, Agent, or Firm*—Schwegman, Lundberg & Woessner, P.A.

(57) ABSTRACT

Apparatus and methods for providing a drive laser beam to a communication unit responsive to the drive laser beam provide the communication unit the ability to provide femtosecond communication. In an embodiment, the communication unit may be configured as an emitter to provide an optical signal for multiplexing into a transmission medium. In an embodiment, the communication unit includes an a time lens in a configuration that provides separation of optical channel signals from a received optical signal and time expansion of each optical channel signal.

30 Claims, 7 Drawing Sheets

US 7,593,643 B2

METHOD AND APPARATUS FOR FEMTOSECOND COMMUNICATION

RELATED APPLICATION

This application claims priority under 35 U.S.C. 119(e) from U.S. Provisional Application Ser. No. 60/521,952 filed 26 Jul. 2004, which application is incorporated herein by reference.

FIELD OF THE INVENTION

This invention relates generally to telecommunications, and more particularly to high speed communication techniques.

BACKGROUND OF THE INVENTION

The steady increase in volume of data transfer will ultimately lead to a need for a radically new approach to telecommunication. Incremental approaches in electronic speeds are reaching the physical limits of what is possible. With optical pulses of a few tens of femtoseconds that are routinely produced, digital communication could in principle reach a rate of tens of THz. The fundamental difficulty in exploiting the high potential data rate of femtosecond optical pulses is that the original signal to be transmitted is at a much slower clock rate, in the GHz rather than THz range.

One approach being taken in telecommunications is wavelength multiplexing. Ten or twenty signals are broadcast simultaneously at neighboring wavelength. There are fundamental limitations for laser communication through wavelength multiplexing. One is that it is still the electronics that determines the speed at which each channel is broadcast. Hence, it is not possible to exploit the fs capability of optics. Additionally, the number of channels is limited by the bandwidth of the emitting/amplifying laser medium. It is simply the ratio of the laser bandwidth to the bandwidth of each channel. The shorter the pulse, the smaller the number of channels available. What is needed is improved methods and apparatus for providing high speed communications.

LITERATURE

[1] J.-C. Diels. Apparatus and method for high laser bandwidth communication. United States patent, Jan. 16, 2001. U.S. Pat. No. 6,175,437.

[2] C. V. Bennett and B. H. Kolner. Principals of Parametric Temporal Imaging, Part I: System Configurations. *IEEE Journal of Quantum Electronics*, 36:430-437, 2000.

[3] C. V. Bennett and B. H. Kolner. Principles of Parametric Temporal Imaging, Part II: System Performance. *IEEE Journal of Quantum Electronics*, 36:649-655, 2000.

[4] Ladan Arissian and Jean-Claude Diels. Mode-locked laser as a combined radio-frequency and optical clock, stabilized to a reference cavity, and calibrated through coherent interaction with rubidium. In *Applications of Photonic Technology* 6, volume 5260-82, pages 217-225. SPIE, 2003.

[5] J.-C. Diels. Apparatus and method for line of sight laser communication. United States patent, Dec. 31, 2002. U.S. Pat. No. 6,501,578.

[6] A. M. Weiner, D. E. Leard, J. S. Patel, and J. R. Wullert. *IEEE J. Quantum Electron.*, 28:908, 1992.

[7] J.-C. Diels and Wolfgang Rudolph. *Ultrashort laser pulse phenomena*. Academic Press, ISBN 0-12-215492-4, Boston, 1995.

[8] B. H. Kolner and M. Nazarathy. Temporal imaging with a time lens. *Optics Lett.*, 14:630-632, 1989.

[9] Z. Wei, Y. Kobayashi, Z. Zhang, and K. Torizuka. Generation of two-color femtosecond pulses by self-synchronization Ti:sapphire and Cr:forsterite lasers. *Optics Lett.*, 26:1806-1808, 2001.

[10] S. Foreman, R. K. Shelton, L.-S. Ma, J. L. Hall, H. C. Kapteyn, M. M. Murnane, M. Notcutt, and J. Ye. Sub-femtosecond timing jitter between two independent, actively synchronized, mode locked lasers. In *CLEO*, 2002, page 603 (CThZ3), Long Beach, Calif., 2002. Optical Society of America.

All publications listed above are incorporated by reference herein, as though individually incorporated by reference.

BRIEF DESCRIPTION OF THE DRAWINGS

Embodiments and features of the present invention will be set forth in part in the description that follows, and in part will become apparent to those skilled in the art by reference to the following description of the invention and referenced drawings. The aspects, advantages, and features of the invention may be realized and attained by means of the instrumentalities, procedures, and combinations pointed out in these embodiments and their equivalents.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description is, therefore, not to be taken in a limiting sense, and the scope of the embodiments of the present invention is defined only by the appended claims, along with the full scope of equivalents to which such claims are entitled.

Figure 1:
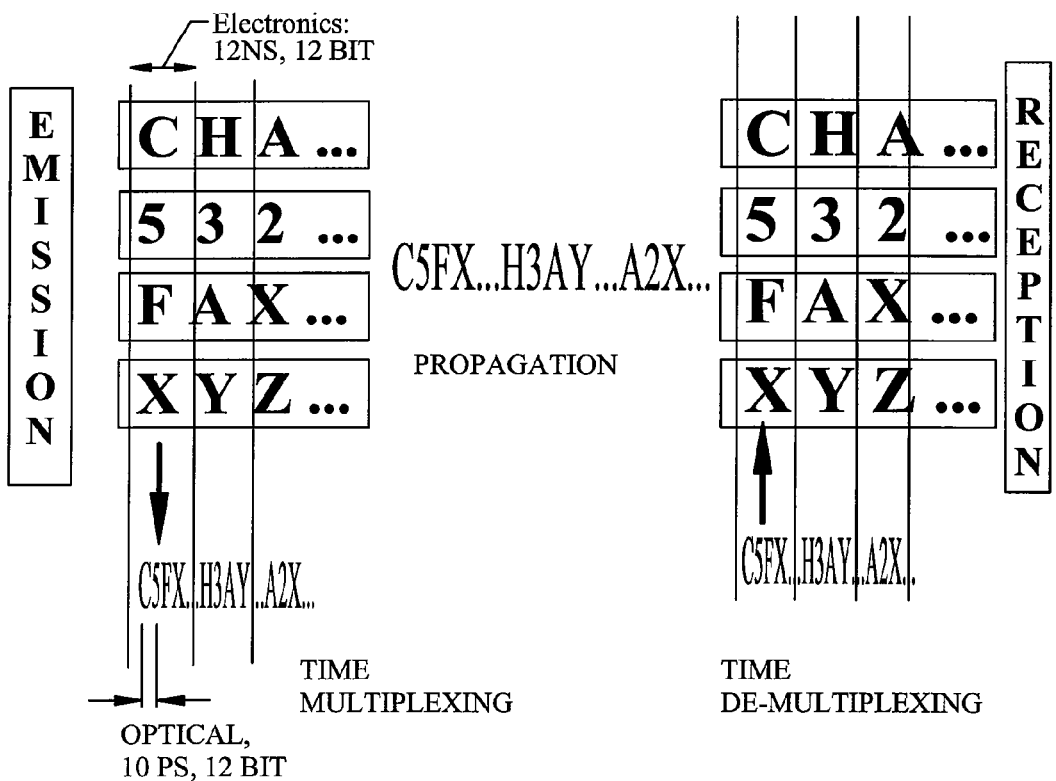
FIG. 1 presents a sketch of time multiplexing.

In an embodiment, a compact integrated optics approach may be used for a framework for THz communications. Such a compact integrated optics approach may use a space-time analogy. Consider a series of channels each containing digital data extracted in 10 bits words each spanning 1 ns. A basic sketch of time multiplexing is presented in FIG. 1. The various channels of communication that are desired to be broadcast simultaneously, in parallel, are represented by successive lines in the left part of the figure. For the purpose of discussion, assume that each character to be transmitted is represented by a 12 bit word, over a total time span of 1 ns. The principle of time multiplexing is to compress each word of each channel, put the compressed words back to back in the time interval of 1 ns, and broadcast the compressed words to the receiver. At the receiver end, each word is re-expanded by the reverse process that was applied at the emitter.

Figure 2:
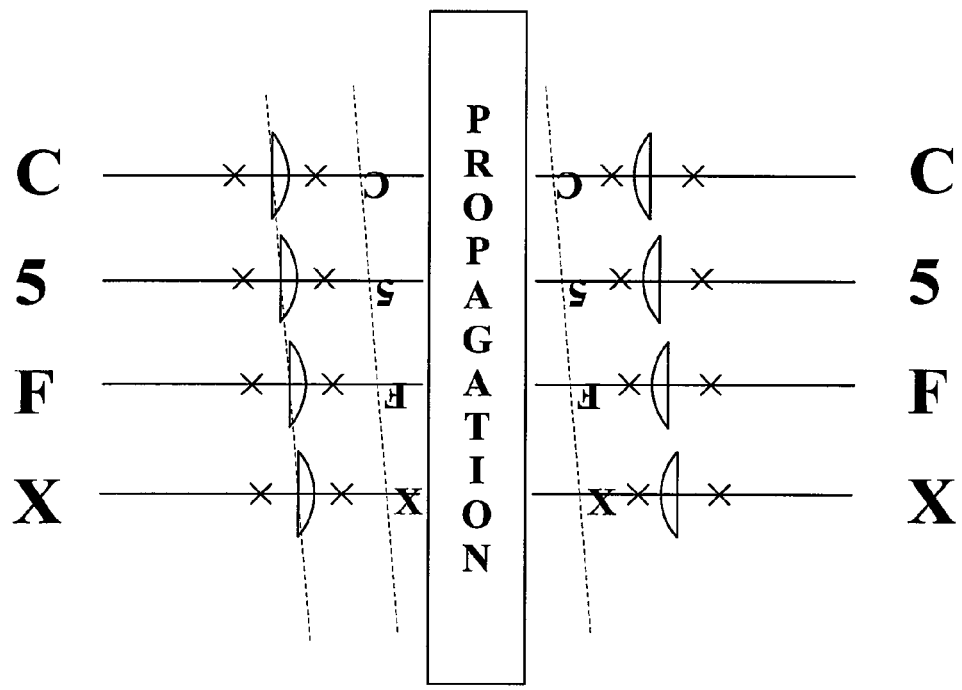
FIG. 2 depicts space analogy of the time multiplexing, limited to the first word of each channel.

If the corresponding word of each channel may be compressed, put back to back, transmitted, and separated at the reception, that operation for each successive word may be repeated, provided all electronics is sufficiently fast (at least 1 GHz). To select the fundamental challenge, consider only one bit packet of each channel, as depicted in FIG. 2, which shows the space analogy of the time multiplexing, limited to the first word of each channel, where the emitter is a de-magnifying lens system and the receiver is a magnifying system. Each corresponding word of the parallel channels is represented in that figure by an alphanumeric character. The role of the time multiplexing equipment, at the emission, is to shrink the time span of the word corresponding to C. This is the time equivalent of a reduced, real image in space, which is typically performed with a lens. The space analogy of the time multiplexing problem under consideration is to reduce the size of the object with a short focal distance lens placed at a large distance compared with the object C. Next the reduced image is transported to the place of reception. There, a microscope type optical system (or just a microscope objective) may be used to magnify the reduced image to its original size.

Note that, in FIG. 2, each successive lens is slightly displaced. In time, that means that each successive word will be given an additional delay, in order to be able to put the various channels back to back in the time (space) that it takes to define the original word C.

Figure 3:
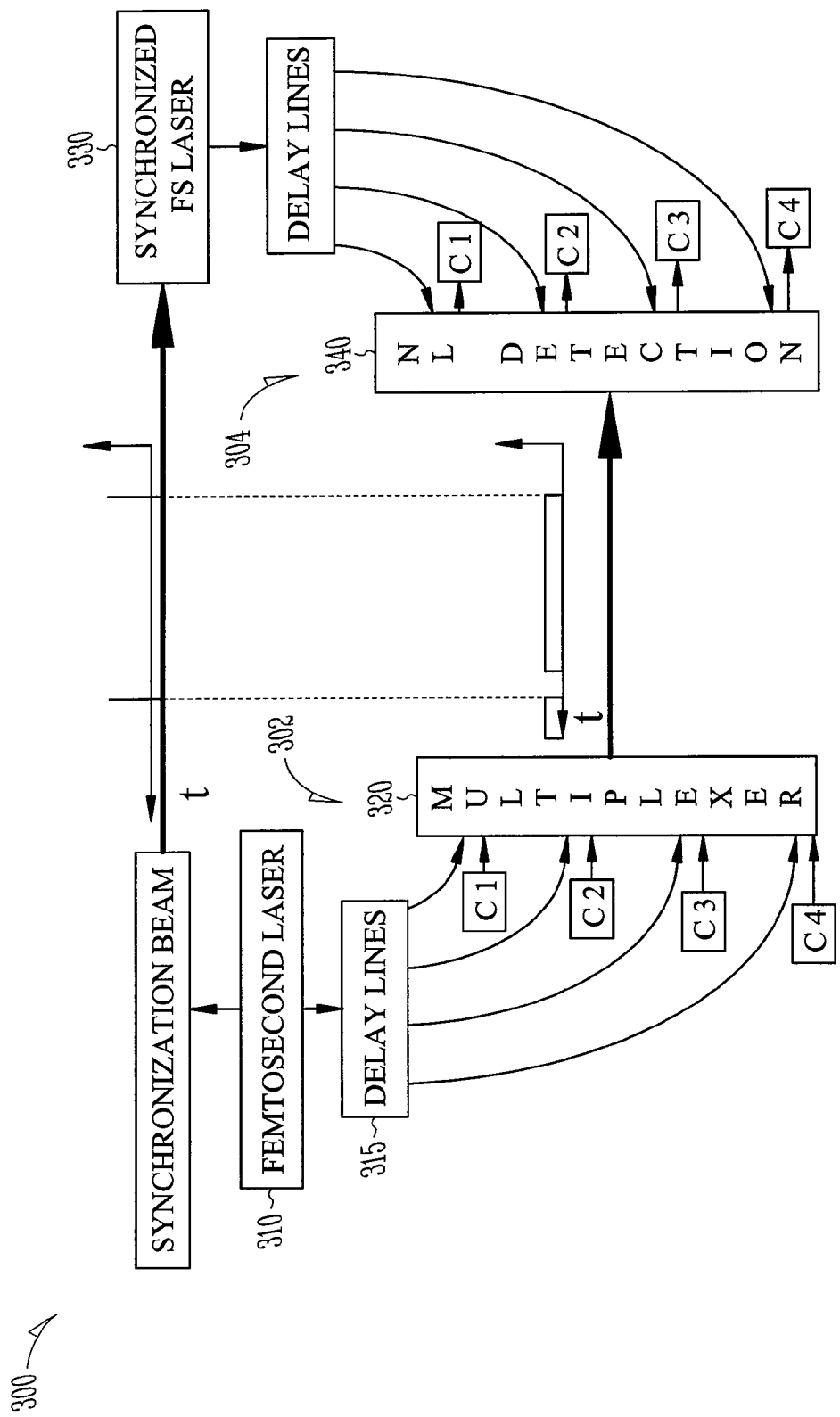
FIG. 3 depicts an embodiment of an overall architecture of a femtosecond time-of-flight communication.

FIG. 3 illustrates an embodiment of a time multiplexing architecture 300. The whole system may be driven by a master oscillator, which is a femtosecond laser 310. The laser pulse is split into as many pulses as there are channels required. There is a relative delay, provided by delay lines 315, between each successive excitation to each channel, delay larger or equal of the length of the compressed word. In an embodiment, a multiplexer 320 fulfills the task of a compressing time lens. The signal corresponding to each channel is transformed into a femtosecond pulse sequence spanning only 1 ps instead of the 1 ns (preferably less) extension of the original word. The data from the various channels to be emitted are put back to back in time. It should thus be possible to time multiplex as many channels as the compression ratio of the multiplexer. Contrary to the case of wavelength multiplexing, the shorter the pulse, the larger the number of channels that can be multiplexed. With a different word being emitted every ps, full advantage of the ultrashort duration of the pulse may be taken, essentially having a communication system working at a rate of ($1/100$ fs) =10 THz.

A synchronization beam of the emitter 302 and receiver 304, indicated by a short pulse the beginning of each string of fs signals, may be derived from the same laser used to provide the fs pulses into each pulse shaper. At the reception, that laser may be used to synchronize a powerful fs source 330 for de-multiplexing the signal beam through nonlinear optics 340. Synchronization of two independent femtosecond lasers may be realized, if they are both stabilized to the same atomic clock, have the same repetition rate and central wavelength.

An approach to an emitter uses a pulse shaper, whose function is to create a pulse coded modulation at the femtosecond level. See U.S. Pat. No. 6,175,437 and U.S. Pat. No. 6,501,578, which are incorporated by reference herein. The basic principle is to disperse the spectrum of a fs pulse with a grating, make an amplitude or phase modulation on a selected number of Fourier components (equal to the number of bits of the word to be transmitted), before recombining the Fourier components in a single beam. A multiplexing application may use an array of pulse shapers that can be addressed in parallel by each channel. The pulse shaper element corresponding to a particular channel may use refresh rate equal to the associated channel, a rate that may be considered to be 1 GHz.

A pulse shaper which can be addressed and refreshed in less than one nanosecond can be made of an array of electro-optic waveguides. The speed requirement may be by using an array of optical waveguides (3 μm diameter) formed by ion implantation, and applying the modulation with 50 Ω coplanar striplines 8.3 μm wide spaced by 5 μm. The small interelectrode spacing may be used to achieve a desired modulation depth with only 5 V applied voltage. A lenslet array may be used to launch the various Fourier components into each of the waveguides of the array, for example 32 waveguides. Straight waveguides provide directly phase modulation of the Fourier component trapped in the waveguide. Mach Zehnder modulator arrays may be used for amplitude modulation. Amplitude modulation however will be more sensitive to perturbations encountered in the propagation process, and therefore phase modulation is preferable. In this approach there is not a limit to the compression, that is, the longer the original word, the less stringent the requirements on the refresh rate of the main modulators. Electronics that carries the original words, which are slow, may be used. If the compression ratio is large, or if the original electronics is slow, significant parallelism may be required to exploit the full potential bandwidth. The central pulse shaper may become extremely costly.

In an embodiment, an apparatus includes a means for providing a drive laser beam having a substantially square pulse with a quadratic phase modulation and a communication unit responsive to the drive laser beam, where the communication unit is adaptable to provide femtosecond communication. The drive laser beam may be provided by a non-linear optical fiber coupled to a femtosecond laser. Various types of femtosecond lasers or sources for a laser beam may be used dependent on the wavelengths used in the particular application. The drive laser beam may be used with a communication unit configured as an emitter. Such a communication unit may impart an optical signal on the drive laser beam and time-compress the optical signal to be emitted into a transmission medium. The transmission medium may be an optical fiber such as in an optical fiber network. The drive laser beam may be used with a communication unit configured as a receiver. Such a communication unit may separate a received optical signal into individual optical channel signals and time-expand each optical channel signal.

The time equivalent of propagation distance is diffraction. To a propagation distance L, the quantity $$L\frac{d^2k}{d\Omega^2}, \tag{1}$$

where $k(\Omega)$ is the wave vector of the light in the medium where the light propagates, may be substituted. The dispersion of the medium $d^2k/d\Omega^2$ is generally a small quantity. There are optical arrangement (pairs of gratings or pairs of prisms) for which Eq. (1) still holds, but the quantity $d^2k/d\Omega^2$ is much larger than for an homogeneous medium. The property of a lens is to create a parabolic wavefront in space. The time equivalent is a device that creates a parabolic phase modulation in time. The temporal focal distance is:

$$f_T = \left(\frac{\partial^2 \psi}{\partial t^2}\right)^{-1} \quad (2)$$

where φ is the phase factor of the complex electric field of the light. The classical lens formula, which in space is:

$$\frac{1}{L_1} + \frac{1}{L_2} = \frac{1}{f} \quad (3)$$

becomes in time:

$$\left(L_1 \frac{d^2 k_1}{d\Omega^2}\right)^{-1} + \left(L_2 \frac{d^2 k_2}{d\Omega^2}\right)^{-1} = (f_T)^{-1} \quad (4)$$

where $L_{1,2}(d^2 k_{1,2}/d\omega^2)$ are the dispersion characteristics of the object and image side, respectively.

Figure 4A:
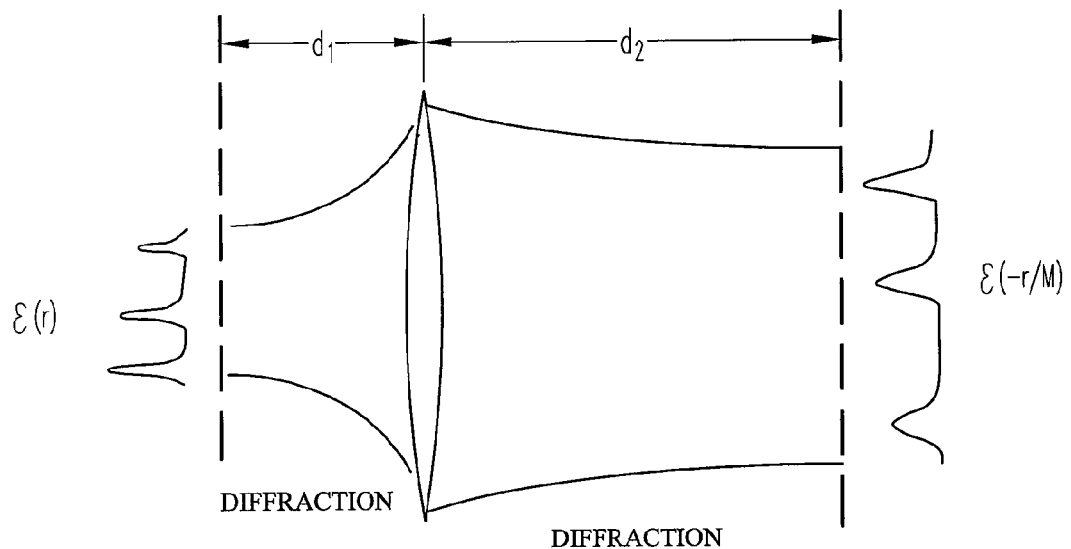
FIGS. 4A-4C show a space-time analogy including use of a time lens that provides the temporal quadratic phase modulation.
Figure 4B:
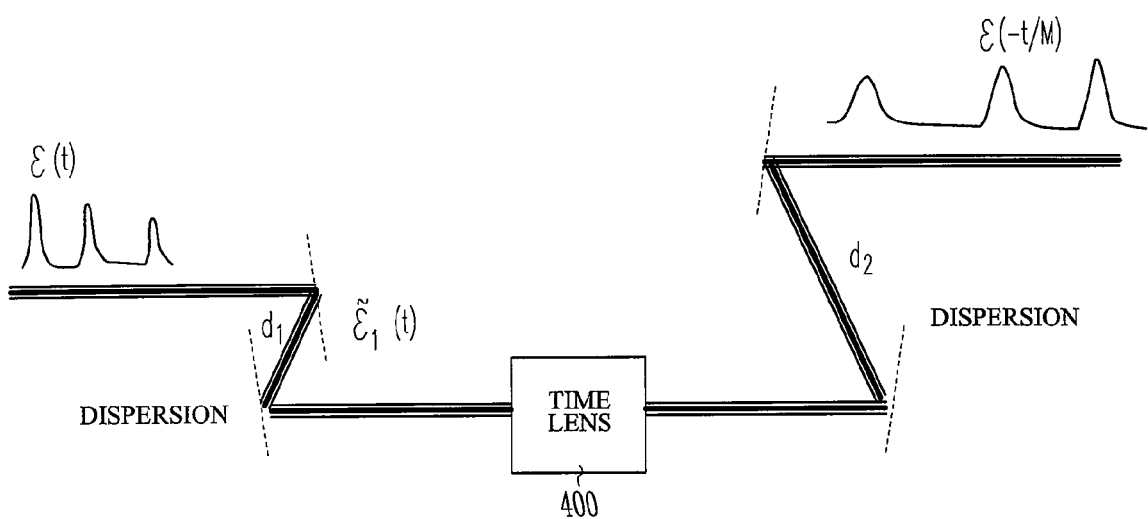
Figure 4C:
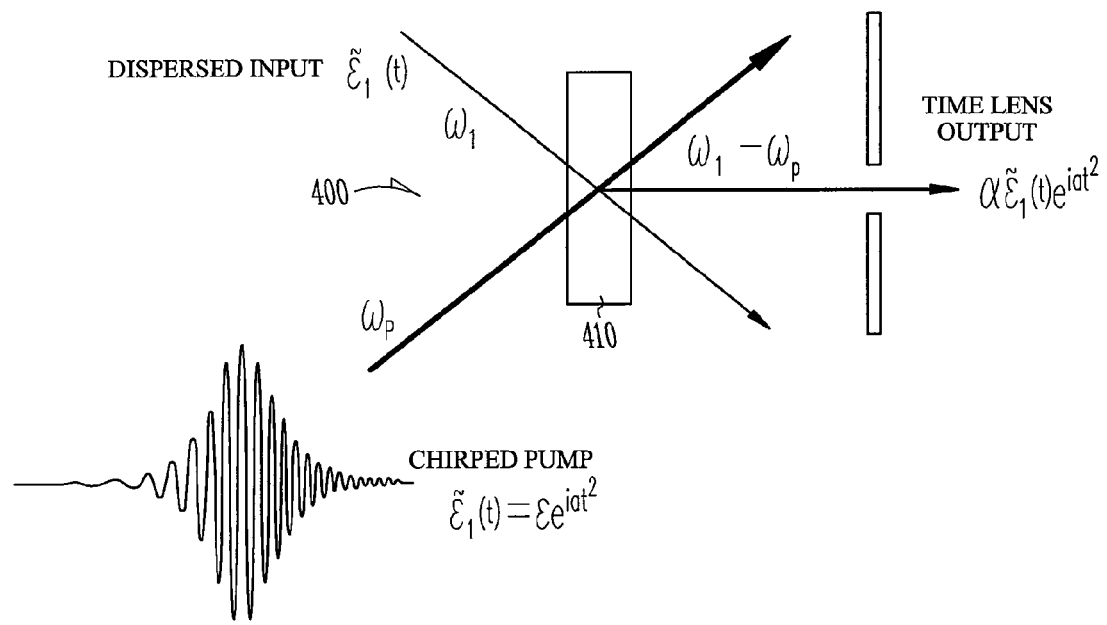

As in optical imaging, to achieve large magnification with practical devices, short focal lengths are desired. For time imaging this translates into a short focal time $f_T$ which in turn requires a suitably large phase modulation. One possible approach to create a large phase modulation is cross-phase modulation, in which a properly shaped powerful pump pulse creates a large index sweep (quadratic with time) in the material of the time lens. Another approach is to use sum or difference frequency generation to impart the linear chirp of one pulse into the pulse to be imaged. The linear chirp may be obtained by propagating of a strong pulse through a fiber. A sketch of the technique, with its spatial analogy, is shown in FIGS. 4A-4C. FIG. 4A shows a spatial imaging configuration. The object is a sketch of a succession of a three pulse sequence. The real image shows a magnified, inverted picture. FIG. 4B shows the temporal imaging configuration. A pair of prisms provides the dispersion analogue to the distances object lens $d_1$ and lens-image $d_2$. The object is a three pulse sequence. The image is a reversed, expanded three pulse sequence. FIG. 4C sketches a time lens 400 that provides the temporal quadratic phase modulation is sketched. The sum or difference frequency of the dispersed signal with a linearly chirped pulse may be made in a nonlinear crystal 410. The pulse may have a square envelope. The output envelope is proportional to the product of the two signal being mixed, and has thus a linear chirp imparted on the signal.

The elements of analogy between classical optics and short pulse propagation are summarized in Table 1.

TABLE 1 summary table comparing space and time lenses

| | Distance | Focal length | Lens formula | Magnification |
|---|---|---|---|---|
| Space | L | f | $\frac{1}{L_1} + \frac{1}{L_2} = \frac{1}{f}$ | $M = \frac{L_1}{L_2}$ |
| Time | $L \frac{d^2 k}{d\Omega^2}$ | $\left(\frac{\partial^2 \varphi}{\partial t^2}\right)^{-1}$ | $\left(L_1 \frac{d^2 k_1}{d\Omega^2}\right)^{-1} + \left(L_2 \frac{d^2 k_2}{d\Omega^2}\right)^{-1} = (f_T)^{-1}$ | $\dfrac{L_1 \frac{d^2 k_1}{d\Omega^2}}{L_2 \frac{d^2 k_2}{d\Omega^2}}$ |

In view of the analogy between femtosecond pulse propagation and classical optics, it may be more convenient to start the discussion in terms of classical optics. A de-magnification of at least 100 for this time demultiplexing scheme may be used to provide a viable scheme. This implies essentially a short focal length f, and a distance from the "object" to the lens of about 100 f. A large dispersion length can be accomplished with gratings. A integrated optics version exists in the form of a Bragg grating on a fiber.

The short focal length is a challenge in temporal optics as well as in spatial optics. Two integrated versions that may be considered include:

1. use of a counter-propagating pump pulse in a medium of very high nonlinear index, imbedded in a microstructure fiber or "holy fiber," and
2. generating externally a linearly chirped pump pulse, to be combined in a parametric oscillator with the signal pulse.

For the emitter, there is a third option may be used that does not involve any lens.

Figure 5:
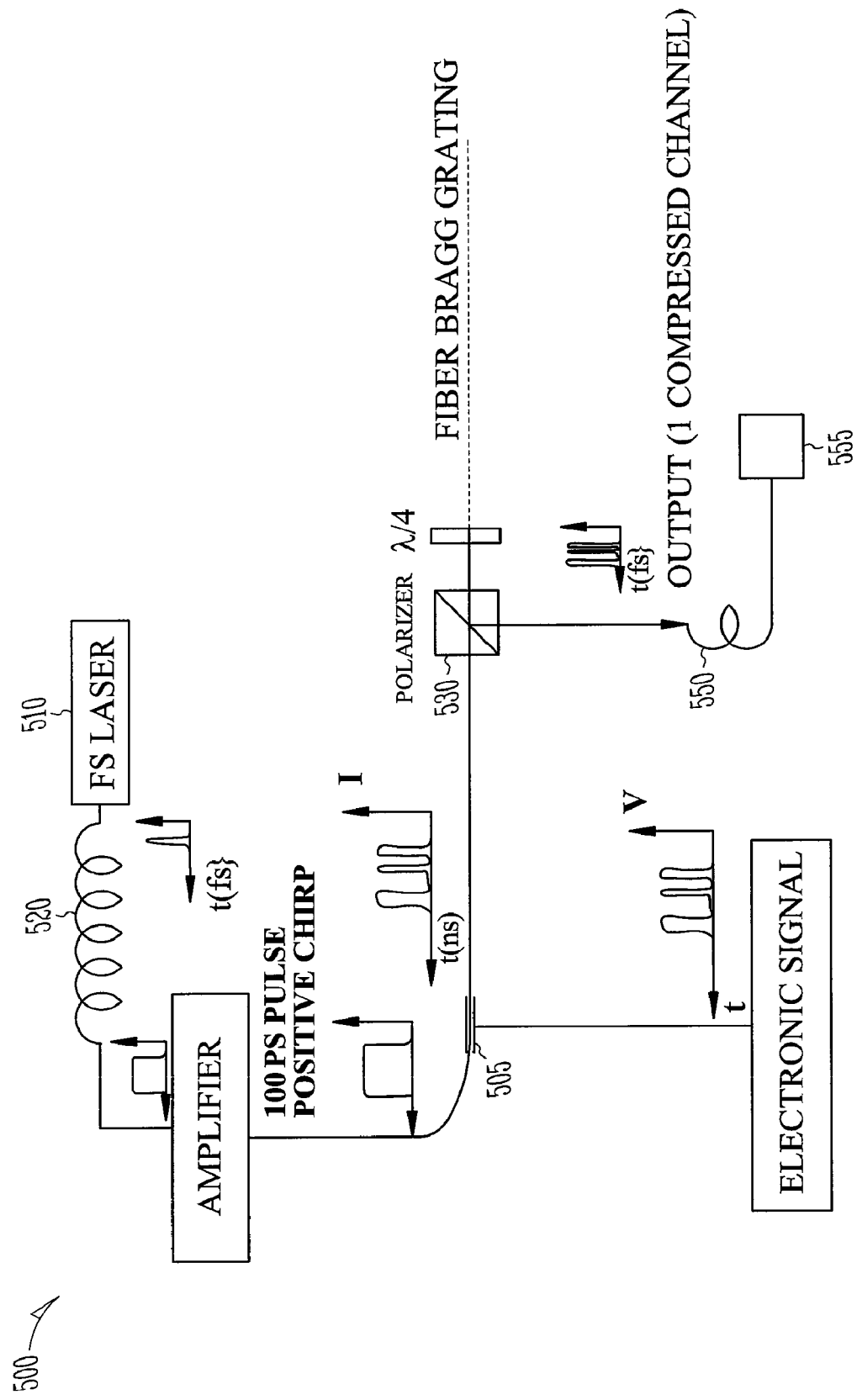
FIG. 5 illustrates an embodiment of an emitter using pulse stretching/compression.

FIG. 5 illustrates a block diagram of an embodiment of an emitter 500 using pulse stretching/compression. In order to impart the signal of a particular channel on the beam, an electro-optic modulator 505 may be used. The light signal to be modulated should be as long as the word of the electronic signal, i.e. of the order of 100 ps. A source 510 of 100 fs pulses may be used. These pulses may be sent through a nonlinear fiber 520. Because of the simultaneous effect of the nonlinearity in fiber 520, and the dispersion, the output of fiber 520 is a square pulse with a quadratic phase modulation. In the space analogue picture, this corresponds to a large, uniform, spherical wavefront. That modulator puts a (transverse) image on the uniform field. To reduce the size of the "image", reversing the propagation may be used. The temporal analogue is to introduce a dispersion opposite to that of the fiber that expanded the beam. This can be achieved with a grating. An integrated implementation uses a Bragg grating 530. The output from Bragg grating 530 may be coupled to a fiber 550 to be provided to an optical combiner 555 to provide multiplexed signals to a transmission medium.

At the reception, the reverse process is needed, namely expanding the data compressed in a very narrow time window into a string of pulses at the original speed that conventional electronics can handle. It is at this level that mode-locked laser stabilization and synchronization comes into consideration, since the relevant bits are only 100 fs long.

There are two distinct tasks to be performed at the reception, each of them slightly more challenging then the corresponding task at the emission. These tasks include separation of the individual channels and time expansion of each channel and conversion into an electronic signal.

Some nonlinear mixing scheme may be used to separate the individual channels. For instance, the $i^{th}$ word of the $j^{th}$ channel may be selected by parametric amplification, using a pump pulse of duration equal that of the word (1 ps).

Demodulation of the amplitude modulated spectrum can be separated by successively delayed picosecond pulses pumping parametric amplifiers.

Figure 6:
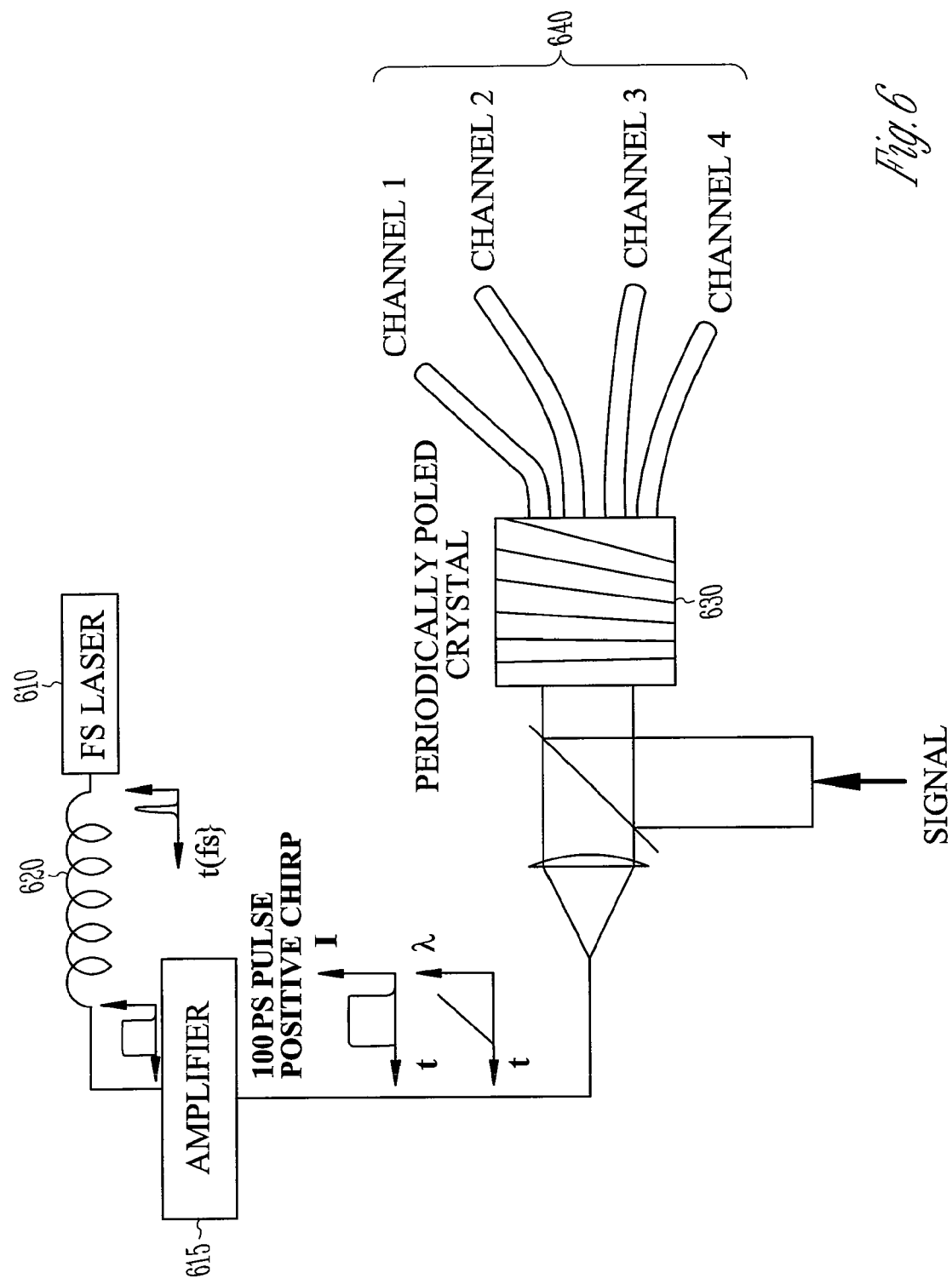
FIG. 6 shows an embodiment of separation of various channels at a reception unit.

In an embodiment, an arrangement similar to the set-up as in the emission may be used. In an embodiment, a pulse stretched to 100 ps with a linear chirp may be used. FIG. 6 shows an embodiment of a separation of various channels at a reception communication unit. A femtosecond laser 610, non-linear fiber optic 620, and an amplifier 615 may be used to provide a drive laser beam that provides a linear chirp to communication unit 605. That linear chirp implies that different time portions of the pulse are identified by different wavelengths. Communication unit 605 includes a periodically poled crystal 630. Periodically poled crystal 630 may be a periodically pole LiNbO$_3$ (PPLN) crystal. PPLN crystals may be made with a transverse variation of the poling periodicity, such that different wavelengths are converted and amplified along that dimension. The pulse from femtosecond laser 610, non-linear fiber optic 620, and an amplifier 615 and a signal received from a transmission medium may be sent into a periodically poled LiNbO$_3$ crystal 630. At the output of the PPLN crystal 630, the various channels 640 are separated in wavelength and position. In an embodiment, femtosecond laser 610 and amplifier 615 may operate at a wavelength of 800 nm. With a received signal at 1.55 μm, output of PPLN 630 may be at 1.65 μm. Various embodiments are not limited to these wavelengths, but may be at wavelengths dependent on the application.

In each channel, the microscopic spacing between pulses may be expanded at least 100 times. This is a classical case of microscopy: short propagating distance, followed by an objective of short focal length, followed by a long propagation distance to the real image where the detector is located. As in the emitter case the propagation may be replaced by grating diffraction, with fiber Bragg reflectors. The challenge is to make a lens with a short focal distance. Two integrated versions that may be considered include:

1. use of a counter-propagating pump pulse in a medium of very high nonlinear index, imbedded in a microstructure fiber or "holy fiber,"

2. generating externally a linearly chirped pump pulse, to be combined in a parametric oscillator with the signal pulse.

Figure 7:
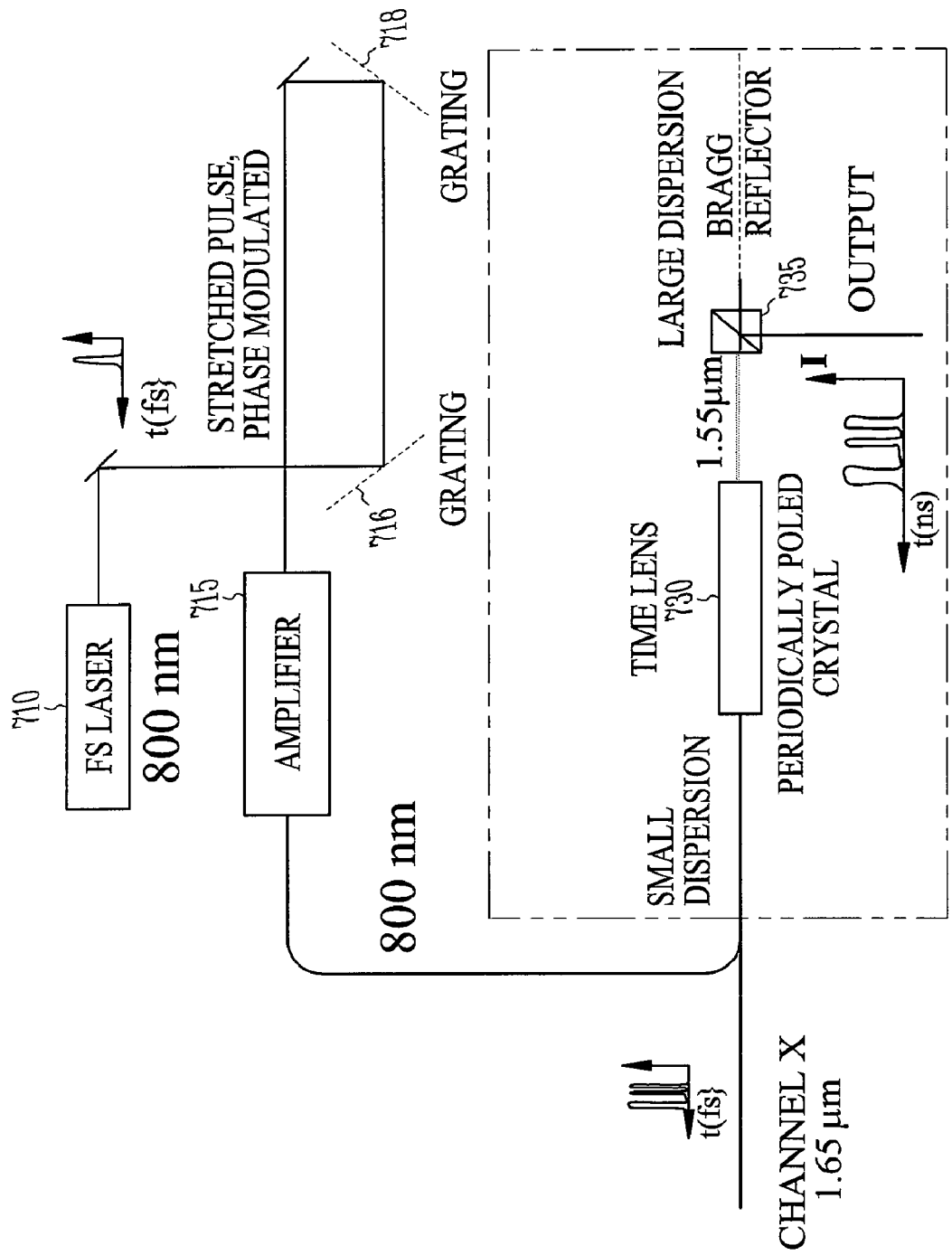
FIG. 7 shows an embodiment of time expansion of a signal of a single channel that is a reverse operation from the operation at the emission end of a transmission medium.

In an embodiment using option (1), a pump having the same wavelength as the received may be used. In an embodiment, option (2) may be used with the channel separation technique discussed above. FIG. 7 shows an embodiment of time expansion of a signal of a single channel that is a reverse operation from the operation at the emission end of a transmission medium. A optical channel signal from one of the channels 640 of FIG. 6 may be provided to a periodically poled crystal 730. In an embodiment, periodically poled crystal 730 is not configured with a transverse variation of poling periodicity and thus provides a fixed period. An optical pump is also provided to periodically poled crystal 730 from femtosecond laser 710. A pair of gratings 716, 718 may be used to create a phase modulation of this pump signal (and to expand it). Amplifier 715 may amplify the phase modulated pump signal. The output of periodically poled crystal 730 may be at the same wavelength as the signal received from a transmission medium illustrated in FIG. 6, where the transmission medium may be an optical fiber in a network. In an embodiment, femtosecond laser 610 and amplifier 615 may operate at a wavelength of 800 nm. The single optical channel signal (from the previous FIG. 6) may be at 1.65 μm. The optical output signal generated by time lens (PPLN) 730 may be at 1.55 μm. The "propagation" for a long distance (large dispersion) may be provided by a Bragg grating 735 on a fiber. In an embodiment, the same laser 610 as shown in FIG. 6 used to separate a received signal into optical channel signals may be used as laser 710 in an arrangement as shown in FIG. 7. In an embodiment, laser 610 and laser 710 may be a Ti:sapphire laser. The output of the Ti:sapphire laser may be amplified, phase modulated through a pair of gratings, and combined in a PPLN crystal with the 1.65 μm radiation of each optical channel signal to generate 1.55 μm, which is sent to a dispersion line and to a detector.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used.

What is claimed is:

1. An apparatus comprising:
   a means for providing a first drive laser beam having a substantially square pulse with a quadratic phase modulation; and
   a communication unit responsive to the first drive laser beam, the communication unit arranged to provide femtosecond communication, the communication unit configured to provide an optical signal to a transmission medium; and
   a femtosecond laser;
   a periodically poled crystal configured to receive a second drive laser beam originated from the femtosecond laser and to receive the optical signal from the transmission medium to separate the optical signal into a plurality of optical channel signals.

2. The apparatus of claim 1, wherein the communication unit includes;
   a means for imparting an optical signal on the first drive laser beam; and
   a means for time-compressing the optical signal to be emitted into the transmission medium.

3. The apparatus of claim 1, wherein the periodically poled crystal is configured to time-expand each optical channel signal.

4. An apparatus comprising:
   a communication unit arranged as an emitter unit to transmit an optical signal on an optical transmission medium to provide femtosecond communication, the communication unit including:
   a femtosecond laser;
   a first dispersion unit coupled to the femtosecond laser to provide a drive laser beam;
   a modulator responsive to a digital electrical signal, the modulator to modulate the drive laser beam;
   a second dispersion unit responsive to the modulated drive laser beam to provide a dispersion in the opposite direction to dispersion provided by the first dispersion unit to provide a time compressed optical signal from the modulated drive laser beam; and
   a combiner to receive the time compressed optical signal, to combine the time compressed optical signal with other optical signals to form a time multiplexed optical signal, and to provide the time multiplexed optical signal for transmission on the optical transmission medium; and a receiving communication unit including:
  a second femtosecond laser; and
  a periodically poled crystal configured to receive a second drive laser beam originated from the second femtosecond laser and to receive the optical signal from the transmission medium to separate the optical signal into a plurality of optical channel signals.

5. The apparatus of claim 4, wherein the first dispersion unit includes a nonlinear optical fiber.

6. The apparatus of claim 4, wherein the modulator includes an electro-optic modulator and the second dispersion unit includes a fiber Bragg grating coupled to the electro-optic modulator to provide the time-compressed optical signal.

7. The apparatus of claim 6, where the apparatus includes a coupling fiber to provide the time-compressed optical signal to the combiner.

8. The apparatus of claim 4, where the optical transmission medium includes an optical fiber.

9. The apparatus of claim 4, wherein the first dispersion unit is arranged to provide a substantially square optical pulse with a quadratic phase modulation.

10. The apparatus of claim 4, wherein the communication unit is configured to transmit digital words onto the optical transmission medium.

11. An apparatus comprising:
  a femtosecond laser;
  an optical fiber coupled to the femtosecond laser to provide a drive laser beam, wherein the optical fiber includes a nonlinear optical fiber; and
  a communication unit responsive to the drive laser beam, the communication unit adaptable to provide femtosecond communication, wherein the communication unit includes a periodically poled crystal configured to receive the drive laser beam and an optical signal received from a transmission medium to separate the optical signal into a plurality of optical channel signals.

12. The apparatus of claim 11, wherein the periodically poled crystal includes a periodically poled $LiNbO_3$ crystal.

13. The apparatus of claim 11, wherein the periodically poled crystal has a transverse variation of poling periodicity.

14. The apparatus of claim 13, wherein the optical fiber coupled to the femtosecond laser is arranged to operatively provide a linear chirp such that different time portions of the optical signal received from the transmission medium are identified by different wavelengths.

15. The apparatus of claim 11, wherein the drive laser beam has a first wavelength, the optical signal received from the transmission medium has a second wavelength, and an optical output of the periodically poled crystal has a third wavelength, the first, second, and third wavelengths being different from each other.

16. The apparatus of claim 15, wherein the first wavelength is at 800 nm, the second wavelength is at 1.55 µm, and the third wavelength is at 1.65 µm.

17. The apparatus of claim 11, wherein the communication unit includes:
  a second femtosecond laser to provide a pump signal;
  gratings to phase modulate the pump signal to provide a phased modulated pump signal;
  a second periodically poled crystal to impart the phase modulation of the pump signal on an optical channel signal; and
  a fiber Bragg grating coupled to the second periodically poled crystal to provide a time-expanded optical output from a communication channel.

18. The apparatus of claim 17, wherein the second periodically poled crystal has a fixed period.

19. The apparatus of claim 17, wherein the pump signal is at a first wavelength, the optical channel signal is at a second wavelength, and an optical output of the second periodically poled crystal is at a third wavelength, the first, second, and third wavelengths being different from each other.

20. The apparatus of claim 19, wherein the first wavelength is at 800 nm, the second wavelength is at 1.65 µm, and the third wavelength is at 1.55 µm.

21. The apparatus of claim 17, wherein the first femtosecond laser and the second femtosecond laser are the same laser.

22. A method comprising:
  generating an optical pump pulse using a first dispersion unit coupled to a femtosecond laser;
  modulating the optical pump pulse in response to a digital electrical signal;
  directing the modulated optical pump pulse to a second dispersion unit to provide a dispersion in the opposite direction to dispersion provided by the first dispersion unit to provide a time compressed optical signal form the modulated drive laser beam;
  directing the time compressed optical signal to a combiner to combine the time compressed optical signal with other optical signals to form a time multiplexed optical signal, and to provide the time multiplexed optical signal for transmission on an optical transmission medium to provide femtosecond communication;
  acquiring a received optical signal from the optical transmission medium, the received optical signal including the time multiplexed optical signal;
  generating a second pump pulse as a linearly chirped optical pump pulse using a non-linear optical fiber coupled to a second femtosecond laser; and
  providing the second pump pulse and the received optical signal to a periodically poled crystal to separate the received optical signal into a plurality of optical channel signals.

23. The method of claim 22, wherein using a first dispersion unit includes using a non-linear optical fiber.

24. The method of claim 23, wherein directing the modulated optical pump pulse to a second dispersion unit includes directing the modulated optical pump pulse to an integrated Bragg grating.

25. A method comprising:
  generating a pump pulse as a linearly chirped optical pump pulse using a non-linear optical fiber coupled to a femtosecond laser; and
  providing the pump pulse to a communication unit to provide femtosecond communication, wherein providing the pump pulse to a communication unit includes providing the pump pulse with a received optical signal from a optical transmission medium to a periodically poled crystal to separate the received optical signal into a plurality of optical channel signals.

26. The method of claim 25, wherein the method includes using a periodically poled crystal with a transverse variation of poling periodicity.

27. The method of claim 26, wherein using a periodically poled crystal with a transverse variation of poling periodicity includes using a $LiNbO_3$ periodically poled crystal with a transverse variation of poling periodicity.

28. The method of claim 25, wherein the method includes:
generating a second pump pulse from a second femtosecond laser;
directing the second pump pulse to a plurality of gratings to generate a phase modulated pump signal;
providing the phase modulated pump signal along with an optical channel signal to a second periodically poled crystal; and
providing an optical output signal from the second periodically poled crystal to a Bragg reflector from which a time-expanded optical output is provided.

29. The method of claim 28, wherein providing the phase modulated pump signal along with a optical channel signal to a second periodically poled crystal includes providing the phase modulated pump signal along with a optical channel signal to a second periodically poled crystal having a fixed period.

30. The method of claim 28, wherein providing an optical output signal from the second periodically poled crystal includes providing an optical output signal at a wavelength that is the same as the received optical signal from the optical transmission medium.

* * * * *

UNITED STATES PATENT AND TRADEMARK OFFICE
CERTIFICATE OF CORRECTION

PATENT NO. : 7,593,643 B2  Page 1 of 1
APPLICATION NO. : 11/189558
DATED : September 22, 2009
INVENTOR(S) : Jean-Claude Diels It is certified that error appears in the above-identified patent and that said Letters Patent is hereby corrected as shown below:

Title page, Item (57), under "Abstract", line 7, delete "an a" and insert -- a --, therefor.

In column 10, line 25, in Claim 22, delete "form" and insert -- from --, therefor.

In column 10, line 36, in Claim 22, delete "chimed" and insert -- chirped --, therefor.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,593,643 B2  Page 1 of 1
APPLICATION NO. : 11/189558
DATED : September 22, 2009
INVENTOR(S) : Jean-Claude Diels It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Twenty-first Day of September, 2010

David J. Kappos
*Director of the United States Patent and Trademark Office*